United States Patent
Ranjan

(10) Patent No.: US 12,413,508 B2
(45) Date of Patent: Sep. 9, 2025

(54) SYSTEM AND METHOD FOR FAULT RECOVERY IN SPRAY BASED NETWORKS

(71) Applicant: Microsoft Technology Licensing, LLC, Redmond, WA (US)

(72) Inventor: Prashant Ranjan, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 133 days.

(21) Appl. No.: 17/687,518

(22) Filed: Mar. 4, 2022

(65) Prior Publication Data

US 2023/0283543 A1    Sep. 7, 2023

(51) Int. Cl.
*H04L 45/28* (2022.01)
*H04L 45/12* (2022.01)
*H04L 101/663* (2022.01)

(52) U.S. Cl.
CPC ............ *H04L 45/28* (2013.01); *H04L 45/124* (2013.01); *H04L 2101/663* (2022.05)

(58) Field of Classification Search
CPC . H04L 45/28; H04L 45/124; H04L 2101/663; H04L 49/25; H04L 41/0677; H04L 41/0659; H04L 49/112
See application file for complete search history.

(56) References Cited

U.S. PATENT DOCUMENTS

| | | | | |
|---|---|---|---|---|
| 5,473,603 A | * | 12/1995 | Iwata | H04Q 11/0478 370/410 |
| 8,416,686 B2 | | 4/2013 | Ferguson et al. | |
| 11,070,474 B1 | | 7/2021 | Jain et al. | |
| 11,119,800 B1 | | 9/2021 | Kowalski | |
| 11,632,326 B1 | * | 4/2023 | Hegar | H04L 45/28 709/238 |
| 2013/0279503 A1 | * | 10/2013 | Chiabaut | H04L 45/44 370/389 |
| 2016/0302197 A1 | * | 10/2016 | Xie | H04L 12/6418 |
| 2017/0187629 A1 | | 6/2017 | Shalev et al. | |
| 2018/0077064 A1 | * | 3/2018 | Wang | H04L 47/115 |
| 2018/0254986 A1 | * | 9/2018 | Solomon | H04L 47/724 |
| 2019/0104057 A1 | | 4/2019 | Goel et al. | |

(Continued)

OTHER PUBLICATIONS

"International Search Report and Written Opinion Issued in PCT Application No. PCT/US22/053900", Mailed Date: Apr. 24, 2023, 13 Pages.

(Continued)

*Primary Examiner* — Abdulkader M Alriyashi
(74) *Attorney, Agent, or Firm* — Alleman Hall & Tuttle LLP

(57) ABSTRACT

Embodiments of the present disclosure include systems and methods for fault detection and recovery over a network. A value of a set of values is stored in packets transmitted during a data transaction between a source and destination. The value corresponds to ports used by one or more switches in the path between the source and destination. The destination includes the value in an acknowledgement packet. Logic circuits in the source device track packets and corresponding values. When a status indicates a particular packet has not received an acknowledgement, the value for the packet may be removed from the set of values. Particular ports that may be congested or down may be detected and the packets re-routed using the logic circuits in the source device.

20 Claims, 4 Drawing Sheets

(56) References Cited

U.S. PATENT DOCUMENTS

| | | |
|---|---|---|
| 2019/0104206 A1 | 4/2019 | Goel et al. |
| 2020/0117625 A1 | 4/2020 | Browne et al. |
| 2020/0280518 A1 | 9/2020 | Lee et al. |
| 2021/0119930 A1 | 4/2021 | Debbage et al. |
| 2021/0250285 A1 | 8/2021 | Noureddine et al. |
| 2021/0297350 A1 | 9/2021 | Vegesna et al. |

OTHER PUBLICATIONS

"Load Balancing on Aggregated Ethernet Interfaces", Retrieved From: https://www.juniper.net/documentation/us/en/software/junos/high-availability/topics/topic-map/load-balancing-aggregated-ethernet-interfaces.html, Dec. 15, 2021, 41 Pages.

* cited by examiner

SYSTEM AND METHOD FOR FAULT RECOVERY IN SPRAY BASED NETWORKS

BACKGROUND

The present disclosure relates generally to computer systems, and in particular to systems and methods for fault recovery in spray based networks.

Modern computer operations often require the movement of large volumes of data between different compute devices. Computer processors, microprocessors, graphics processors, and artificial intelligence (AI) processors, for example, may work together to perform various tasks. Accordingly, the processors may be required to share or otherwise move data between two (2) processors or even between large groups of processors working on a common task.

Accordingly, processors are typically connected together using network switches. Numerous network switches may be used to connect groups of processors. Processors are typically connected to a portion of ports of each network switch, and other ports of the network switch are connected other switches over links to move data between the various processors.

For any large-scale network, occurrence of a fault can be very frequent (of the order of every few minutes). These faults occur due to different reasons, such as link failure, unrecoverable hardware errors, etc. For a network packet, these errors show up as a path failure.

Typically, path/link failure is detected and isolated in software, and the typical way to recover from these are to remove the faulty link or device and remap it to a spare device/link provisioned in the network. This whole process can be very time and resource consuming and may add a significant overhead to the network operating costs.

Accordingly, techniques for detecting and recovering from network faults can be advantageous in compute applications.

DETAILED DESCRIPTION

Described herein is are network fault detection and recovery techniques. In the following description, for purposes of explanation, numerous examples and specific details are set forth in order to provide a thorough understanding of some embodiments. Various embodiments as defined by the claims may include some or all of the features in these examples alone or in combination with other features described below and may further include modifications and equivalents of the features and concepts described herein.

In some embodiments, features and advantages of the present disclosure include techniques to detecting and recovering from faults in a computer network. In various embodiments disclosed herein, a value from a plurality of values is stored in a packet sent to a destination. The values correspond to particular ports of a plurality of ports used by different packets during a particular transmission between a source device and destination device. When the destination responds with an acknowledgement packet, the value extracted from the packet sent by the source and stored in an acknowledgement packet. The transmitting device may monitor sent packets and corresponding values. When a status of packets with a particular value indicates congestion or failure of a particular port (corresponding to the value), the particular value is removed from the plurality of values. Accordingly, traffic may be routed around the problematic port. The values may sometimes be referred to herein as "entropy values," for example. The present techniques are particularly advantageous in a spray network. Various example implementations and further illustrative details are set forth below.

Figure 1:
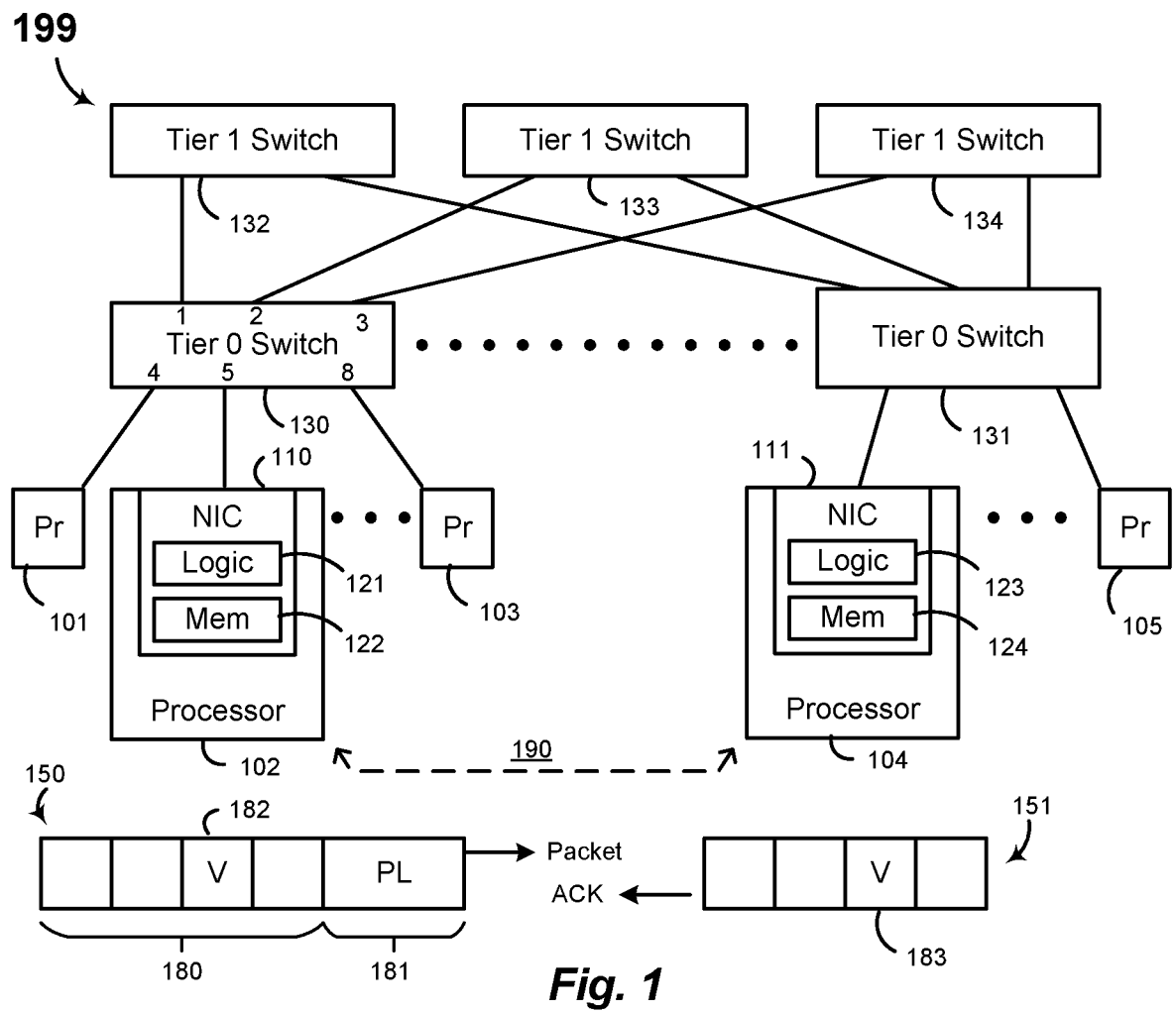
FIG. 1 illustrates a computer system and network according to an embodiment.

FIG. 1 illustrates a system according to an embodiment. Here, a plurality of processors 101-105 are coupled together over a network 199. In this illustrative example, processors 101-105 are connected to a plurality of tier 0 switches 130-131. Tier 0 switches 130-131, in turn, are connected to tier 1 switches 132-134. In other embodiments, additional layers of switches (e.g., tier 2 connecting tier 1, etc. . . . ) may be used. Processors 101-105 include network interface circuits (NIC) 110/111 configured to transmit and receive a plurality of packets. For example, one processor (e.g., processor 102) may send data to another processor (e.g., processor 104). A data transmission 190 may be set up between the processors. The data in processor 102 to be sent may be broken up and included as a payload (PL) in a plurality of packets being transmitted to a destination (e.g., processor 104). An example packet is illustrated at 150, and typically includes a header 180 and payload (PL) 181. When each packet arrives at the destination (e.g., processor 104), an acknowledgement packet is generated by the destination device and sent back to the source device. An example acknowledgement packet is illustrated at 151. Accordingly, NICs 110 and 111 (and other processor NICs in the system) may transmit and receive a plurality of packets and a plurality of acknowledgement packets during a data transmission process.

Features and advantages of the present disclosure include storing at least one value 182 in each packet 150 being transmitted to a destination. The value 182 may map to a particular port to be used in a switch that the packet passes through during the transmission to the destination (e.g., ports 1, 2, or 3 in switch 130). For example, a switch may receive a packet and select a particular port to send the packet out on based on the value. Examples of mapping values to ports are illustrated further below. Additionally, the destination device may receive the packets and include the value 183 from each received packet in a corresponding acknowledgement packet 151 transmitted from the destination back to the source in response to a transmitted packet. For example, value 183 in acknowledgement packet 151 may be the same as value 182 for a corresponding packet 150. Accordingly, processor 102 may store, in a memory 122, the values stored in each transmitted packet, and remove a particular value from the plurality of values based on a status of an acknowledgement packet. For instance, if a packet with a particular value times-out (e.g., because the port corresponding to a particular value is down), the value may be removed from the plurality of values (e.g., to prevent use of a value that maps to a bad port). In other embodiments, packets having particular values may be tracked by the source device, and when a count of packets having a particular value exceeds a threshold (e.g., no acknowledgements have been received), the system may remove the particular value from the plurality of values (e.g., because the port corresponding to the value is either congested or down). As shown in FIG. 1, the NICs for each processor may have logic circuits 121 to stored the values in the packets, store values in a memory (e.g., for tracking), and remove values from a set of values used by the packets based on status.

Figure 2:
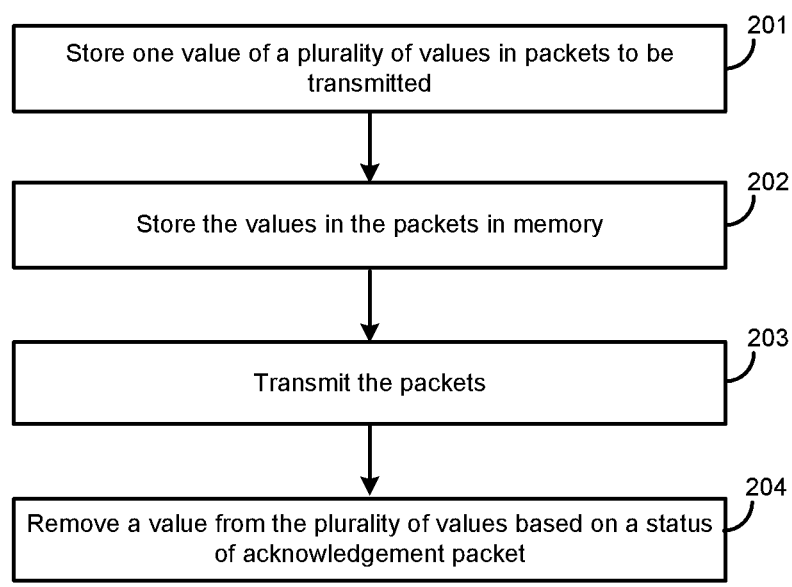
FIG. 2 illustrates a method of recovering from faults in a network according to an embodiment.

FIG. 2 illustrates a method of recovering from faults according to an embodiment. At 201, one value of a plurality of values is stored in each packet of a plurality of packets to be transmitted from a source device to a destination device during a data transmission. The plurality of values may map to particular ports of a plurality of ports of at least one switch the plurality of packets pass through during the data transmission to the destination device. At 202, the values stored in each transmitted packet are stored in a memory of the source device. At 203, the plurality of packets are transmitted. During the transmission, at 204, a particular value may be removed from the plurality of values to be stored in packets being transmitted based on a status of at least one acknowledgement packet to be received from a destination device in response to a transmitted packet.

Figure 3:
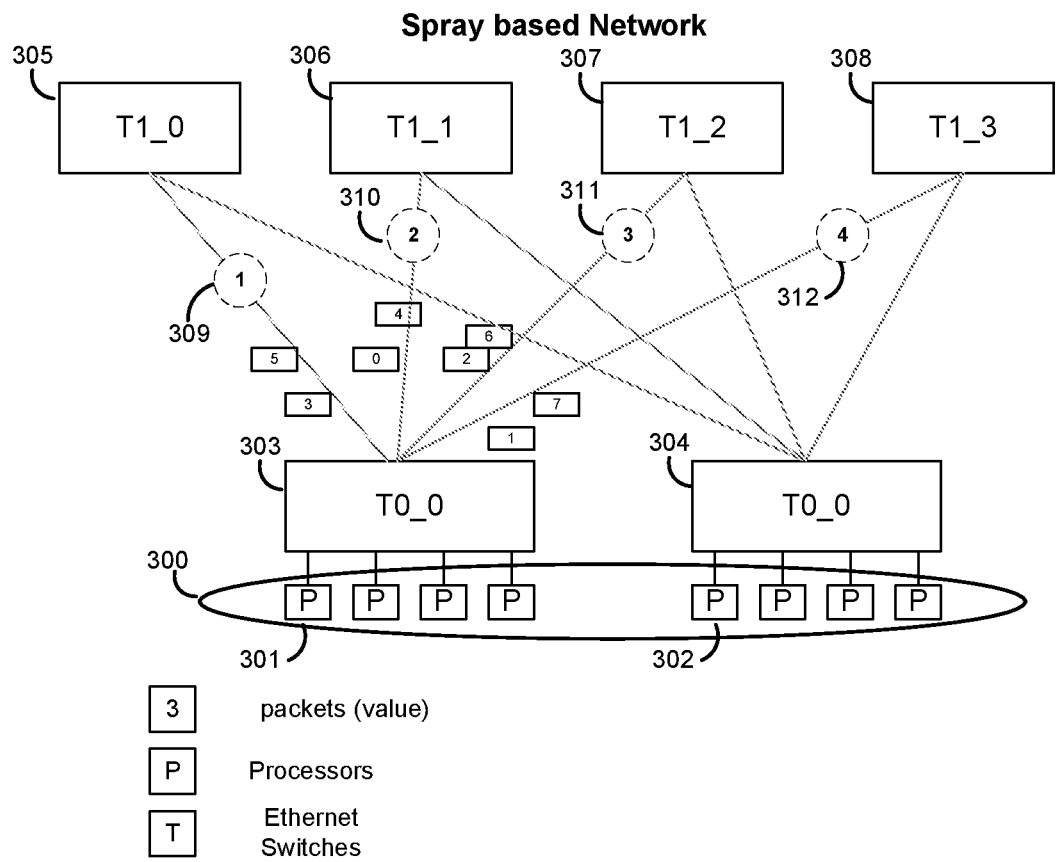
FIG. 3 illustrates an example computer system and network according to another embodiment.
Figure 3:
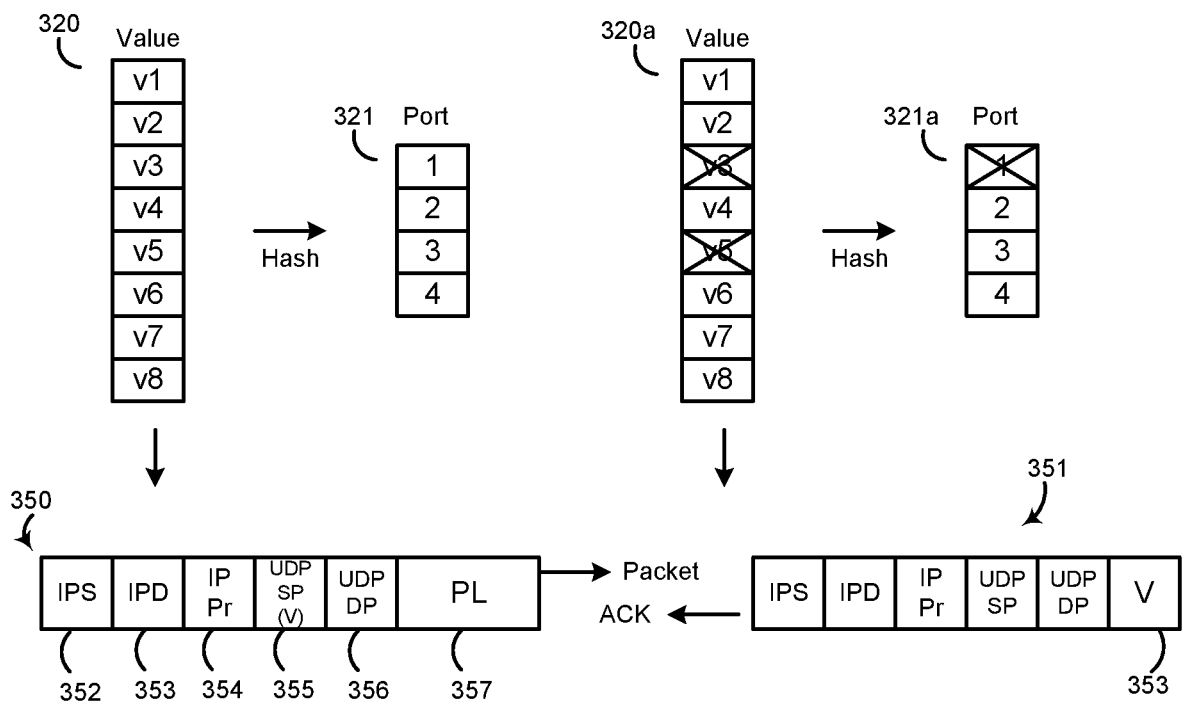

FIG. 3 illustrates an example computer system and network according to another embodiment. In this example, processors 300 are coupled together over a network comprising tier 0 switches 303-304 and tier 1 switches 305-308. Tier 0 switch 303 (T0_0) may have 4 downlinks between processors and ports 1-4 and 4 uplinks between ports 5-8 and each of tier 1 switches 305-308, respectively. For example, on switch 303, port 5 may be connected to switch 305 over link 1 (309), port 6 may be connected to switch 306 over link 2 (310), port 7 may be connected to switch 307 over link 3 (311), and port 8 may be connected to switch 308 over link 4 (312).

According to various embodiments, values may be stored in transmitted packets 350 and acknowledgement packets 351. In this example, the packets 350 and 351 comprise an internet protocol (IP) source field (IPS) 352, IP destination field (IPD) 353, IP protocol field (IP Pr) 354, User Datagram Protocol (UDP) source field (USP SP) 355, a UDP destination field (UDP DP) 356, and a payload field storing packets of data. User Datagram Protocol (UDP) is a member of the Internet protocol suite and is known to those skilled in the art of computer networking. With UDP, computer applications can send messages, in this case referred to as datagrams, to other hosts on an Internet Protocol (IP) network.

In this example, a set of values v1-v8 320 are stored in the UDP source field 355 of packets 350. When a packet 350 is processed by a switch, such as tier 0 switch 303, the value (V) in the UDP source field 355 may be used to select the switch port used to forward the packet. For example, switch 303 may read the value (V) from the UDP source field 355 and map the value (V) to a port number. In one embodiment, the switch may perform a hash function on the value. A hash function (or just "hash") is a function that maps data of arbitrary size to fixed-size values (e.g., 8:4). The values returned by a hash function are called hash values, hash codes, digests, or simply hashes. In this example, there are 8 values that hash to port numbers 321 (e.g., 1-4, the ports for connections between tier 0 switch 303 and tier 1 switches 305-308). Accordingly, a NIC in processor 301 may store different values (V) in different packets (e.g., cycling through values v1-v8 on successive packets), and as the packets are received and hashed by switch 303, the packets are forwarded to the destination through different ports and over different links 309-312 (e.g., Ethernet cable connections). Here, values in packets 3 and 5 hash to a first port connected to switch 305 over link 309, packets 0 and 4 hash to a second port connected to switch 306 over link 310, packets 2 and 6 hash to a third port connected to switch 307 over link 311, and packets 1 and 7 hash to a fourth port connected to switch 308 over link 312. The packets are said to "spray" out across the network. Accordingly, the presently described technique, where packets of a data transmission between a source and destination travel over different ports of one or more switches, is referred to as a "spray" network. It is to be understood that multiple switches may send packets over different ports and connections available between the source and destination both in the uplink direction (e.g., connections between tier 0 to tier 1) and multiple downlink direction (if available). For networks with more tiers, there may be multiple ports on multiple switches for packets to pass through during the transmission to arrive at the destination.

When the packets arrive at the destination device, here a NIC in processor 302, an acknowledgement packet (ACK) 351 is generated. ACK 351 includes the same header fields as the packet. However, the NIC in processor 302 may read the value (V) out of the received packet and store the value in ACK 351. In this example, the received value (V) from the packet is stored in a payload 353 of ACK 351. ACK 351 is transmitted back to the source.

In various embodiments, a variety of techniques may be used to track the status of the acknowledgement packets. In one embodiment, the source device may store, in a memory, a packet identifier for each packet being transmitted (e.g., a unique packet sequence number for each packet). The packet identifier may be associated with the value stored in the packet. The following Table 1 is illustrative:

TABLE 1

| Packet ID | Value | Port | ACK(Y/N) |
|---|---|---|---|
| 1 | 3 | 1 | |
| 2 | 7 | 4 | |
| 3 | 4 | 2 | |
| 4 | 1 | 4 | |

Table 1 shows illustrative packet IDs, associated values, and corresponding ports (which may not be stored in memory, but are included here for illustrative purposes). In some example embodiments, every packet sent from a source device to a destination device has an entropy value field which is randomly generated, and the same entropy value is carried back by the corresponding ACK(Acknowledgement) packet back to sender. For each packet, when a ACK packet is received storing the value (e.g., 3), the entry in a table (e.g., Table 1) may be deleted. However, if the ACK packet containing the value 3 is not received within a certain timeframe, a timeout may occur. The timeout may indicate that the port 1 is congested or non-functional. Accordingly, the value of 3 may be removed from the set of values 320 as illustrated at 320a. Over time, the value of 5, also corresponding to port 1 in this example, may similarly timeout and be removed from the set of values 320 as illustrated at 320, thus eliminating port 1 from the available paths the switch may use to forward packets during the data transaction as illustrated at 321a.

In other embodiments, the status may comprise one or more counts of pending acknowledgement packets being above a threshold, and the pending acknowledgement packets correspond to a plurality of transmitted packets having the particular value. Table 2 illustrates a table of counts that may be used to determine if a particular port is congested or non-functional:

TABLE 2

| Value# (Entropy#) | Pending ACK count |
|---|---|
| 1 | 100 |
| 2 | 80 |
| 3 | 120 |
| 4 | 2000 |
| 5 | 150 |
| 6 | 50 |
| 7 | 1500 |

By using the pending ACK count statistics per entropy, logic circuits in the processor NIC can quickly isolate entropies and corresponding paths having an abnormally higher pending ACKs. The pending ACKs may be higher than a set threshold, for example, which may correspond to a higher than average/expected range or variance. For instance, in Table 2 above, Entropy 4 and 7 are seeing abnormally high pending ACK count, which may indicate a faulty path taken by these entropy packets. Once faulty paths are identified, the system and can swiftly remap those paths by not using the troubled entropy values (e.g., entropy values 4 and 7), for example, until the next sampling interval. As mentioned above, the values corresponding to a status indicating a fault may be removed from the set of values stored in the packets, thereby removing particular switch ports from the source-destination path, for example.

Figure 4:
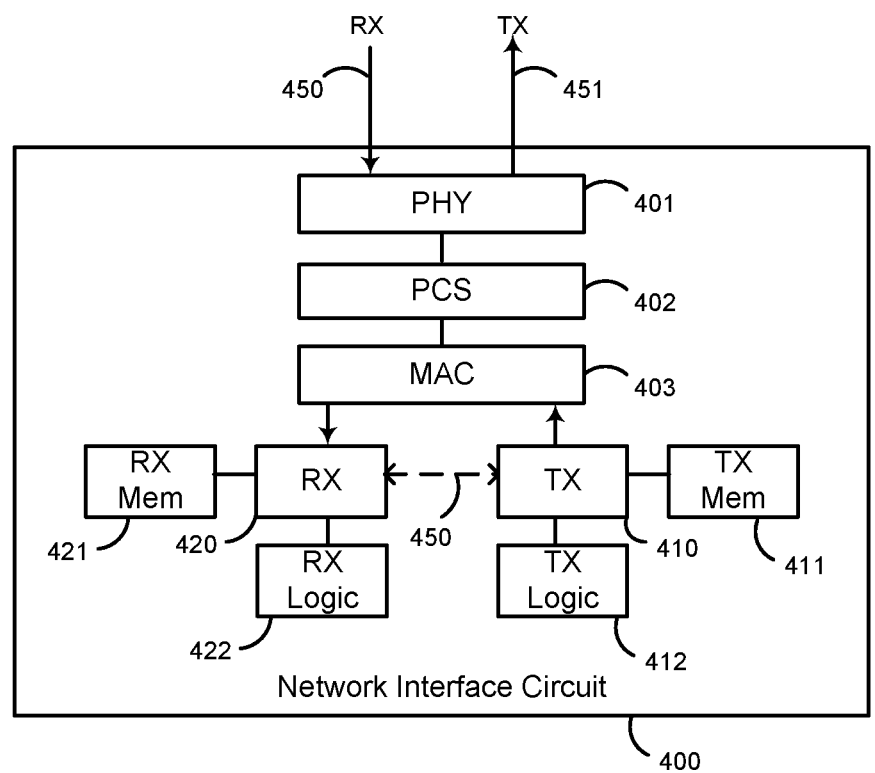
FIG. 4 illustrates an example network interface circuit according to another embodiment.

FIG. 4 illustrates an example network interface circuit (NIC) 400 according to another embodiment. NIC 400 includes a transmit (TX) processor 410 coupled to TX memory 411 and TX logic circuit 412. TX logic circuit 412 may include circuitry for generating packets and storing one value from a set of value in each packet during a data transaction with a destination device. TX logic circuit 412 may store, in TX memory 411, packet IDs associated with each value so the NIC can track packets sent and received with particular values. TX processor 410 sends packets through a media access controller (MAC) 403, physical coding sublayer (PCS) 402, and physical layer (PHY) 401 to transmit wires (TX) 451.

An ACK packet may be received on receive wires (RX) 450 and coupled through PHY 401, PCS 402, and MAC 403 to receive (RX) processor 420. RX logic circuit 422 may detect and extract the packet ID and value, of the set of values, from the ACK packet (e.g., encoded in the payload) and signal TX logic 412 that an ACK packet with a particular ID and value has been received so TX logic 412 can deleted the packet ID and associated value from TX memory 411, for example.

TX logic circuit 412 may include logic circuits to remove a value from the set of values based on a status of ACK packets corresponding to packets stored in memory. For example, in some embodiments TX logic circuit 412 may further include a timer. TX logic circuit 412 may include logic circuitry to determine if a packet ID and value of a sent packet are in memory after the timer reaches a predetermined time period (e.g., a timeout) where no ACK packet with the packet ID has been received. If no ACK packet is received after the timer times out, then a fault is generated and the particular value is removed from the set of values. In another embodiment, TX logic circuit 412 may include a counter. The counter may count transmitted packets having a particular value and stored the count in TX memory 411 in association with the particular value from the set of values. TX logic circuit 412 may monitor a plurality of counts for a plurality of values in the set of values and generate a fault when the value exceeds a threshold. The fault causes the TX logic circuit 412 to remove the particular value from the set of values.

In some cases, NIC 400 is part of a destination device and receives a packet with a value from a set of values and generates an ACK packet. In this case, RX logic circuit 422 may extract a value and a packet ID from a received packet. The extracted value and packet ID may be sent to TX logic circuit 412, which may store the value and packet ID in an ACK packet. As mentioned above, TX logic circuit 412 may store the value in a payload of the ACK packet for example. The ACK packet may be transmitted back to the source device through the MAC, PCS, and PHY, for example.

Figure 5:
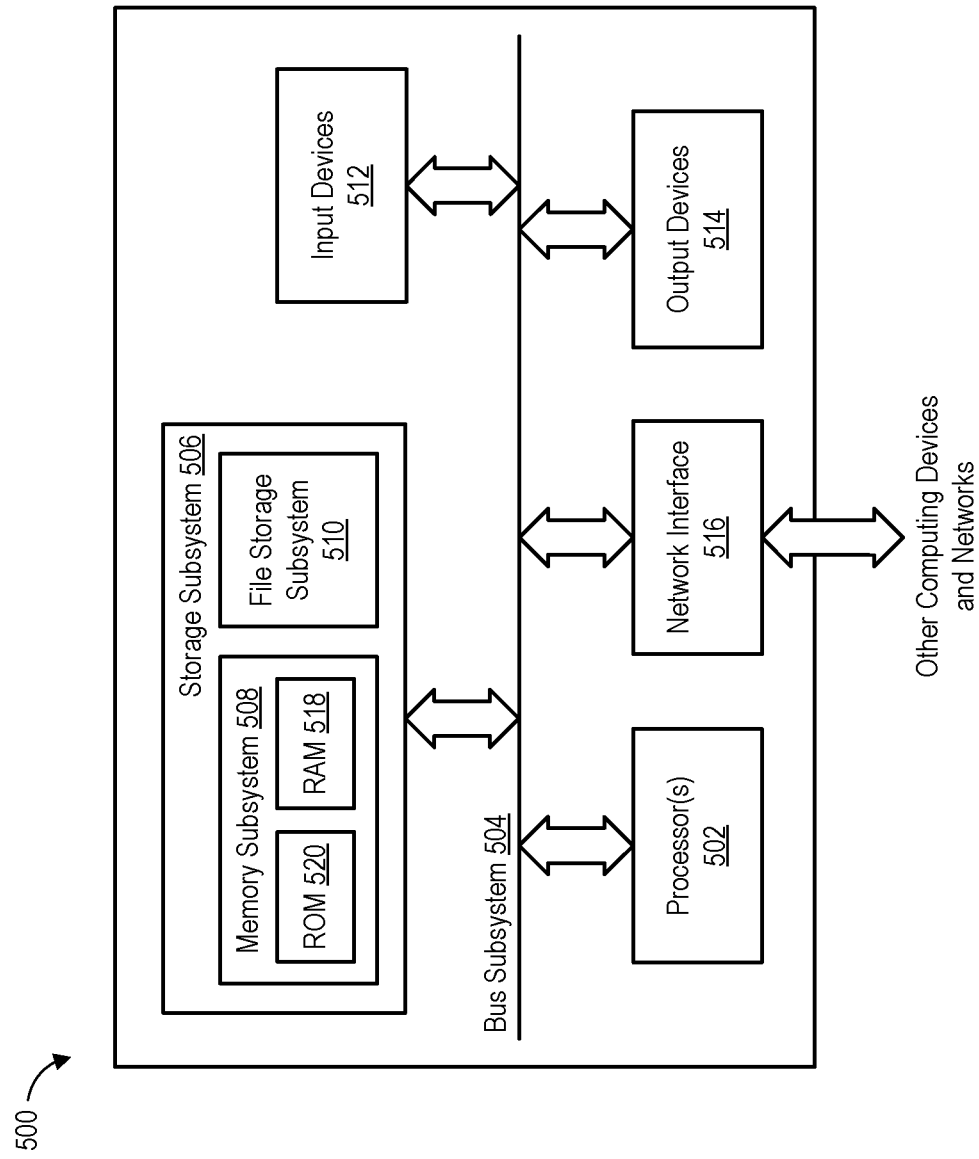
FIG. 5 illustrates a simplified block diagram of an example computer system used to execute HDL code according to various embodiments.

FIG. 5 illustrates a simplified block diagram of an example computer system used to execute hardware description language (HDL) code according to various embodiments. In some embodiments, computer system 500 executes hardware description code to generate logic circuits and/or other portions of an integrated circuit to perform the techniques described herein. A hardware description language (HDL) is a specialized computer language used to describe the structure and behavior of electronic circuits, and most commonly, digital logic circuits. HDL code may be executed on a computer system to generate digital logic circuits, including circuits described herein. FIG. 5 illustrates a simplified block diagram of an example computer system 500, which can be used to implement the techniques described in the foregoing disclosure. In some embodiments, computer system 500 may be used to generate a logic circuits described above, for example. As shown in FIG. 5, computer system 500 includes one or more processors 502 that communicate with a number of peripheral devices via a bus subsystem 504. These peripheral devices may include a storage subsystem 506 (e.g., comprising a memory subsystem 508 and a file storage subsystem 510) and a network interface subsystem 516. Some computer systems may further include user interface input devices 512 and/or user interface output devices 514.

Bus subsystem 504 can provide a mechanism for letting the various components and subsystems of computer system 500 communicate with each other as intended. Although bus subsystem 504 is shown schematically as a single bus, alternative embodiments of the bus subsystem can utilize multiple busses.

Network interface subsystem 516 can serve as an interface for communicating data between computer system 500 and other computer systems or networks. Embodiments of network interface subsystem 516 can include, e.g., Ethernet, a Wi-Fi and/or cellular adapter, a modem (telephone, satellite, cable, ISDN, etc.), digital subscriber line (DSL) units, and/or the like.

Storage subsystem 506 includes a memory subsystem 508 and a file/disk storage subsystem 510. Subsystems 508 and 510 as well as other memories described herein are examples of non-transitory computer-readable storage media that can store executable program code and/or data that produce circuits having the functionality of embodiments of the present disclosure.

Memory subsystem 508 includes a number of memories including a main random access memory (RAM) 518 for storage of instructions and data during program execution and a read-only memory (ROM) 520 in which fixed instructions are stored. File storage subsystem 510 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 500 is illustrative and many other configurations having more or fewer components than system 500 are possible.

Further Examples

Each of the following non-limiting features in the following examples may stand on its own or may be combined in various permutations or combinations with one or more of the other features in the examples below.

In one embodiment, the present disclosure includes a circuit comprising: a memory; a network interface circuit configured to transmit and receive a plurality of packets and a plurality of acknowledgement packets; and a logic circuit configured to store at least one value of a plurality of values in each packet of the plurality of packets being transmitted to a destination, the at least one value mapping to one port of a plurality of ports of at least one switch the plurality of packets pass through during the transmission to the destination, wherein the logic circuit is further configured to store, in the memory, the values stored in each transmitted packet, the logic circuit removing a particular value from the plurality of values to be stored in packets being transmitted based on a status of at least one acknowledgement packet to be received from a destination in response to a transmitted packet.

In another embodiment, the present disclosure includes a method of recovering from faults in a network comprising: storing one value of a plurality of values in each packet of a plurality of packets to be transmitted from a first device to a destination device during a data transmission, the plurality of values mapping to particular ports of a plurality of ports of at least one switch the plurality of packets pass through during the data transmission to the destination device; storing, in a memory of the first device, the values stored in each transmitted packet; transmitting the plurality of packets; removing a particular value from the plurality of values to be stored in packets being transmitted based on a status of at least one acknowledgement packet to be received from a destination device in response to a transmitted packet.

In another embodiment, the present disclosure includes a non-transitory machine-readable medium storing a hardware definition language (HDL) program executable by a computer, the program comprising sets of instructions for: storing one value of a plurality of values in each packet of a plurality of packets to be transmitted from a first device to a destination device during a data transmission, the plurality of values mapping to particular ports of a plurality of ports of at least one switch the plurality of packets pass through during the data transmission to the destination device; storing, in a memory of the first device, the values stored in each transmitted packet; transmitting the plurality of packets; and removing a particular value from the plurality of values to be stored in packets being transmitted based on a status of at least one acknowledgement packet to be received from a destination device in response to a transmitted packet.

In one embodiment, the at least one switch selects a port for a particular packet based on the value.

In one embodiment, the status is a timeout.

In one embodiment, the status comprises one or more counts of pending acknowledgement packets being above a threshold, wherein the pending acknowledgement packets correspond to a plurality of transmitted packets having the particular value.

In one embodiment, the circuits, methods, and programs may further store, in the memory, a packet identifier, wherein the packet identifier for each packet being transmitted is associated with the at least one value stored in the packet.

In one embodiment, the at least one value is stored in a User Datagram Protocol (UDP) source field of a header of the plurality of packets being transmitted to the destination.

In one embodiment, the logic circuit is further configured to, for each packet received from a source, store a received value from a received packet in an acknowledgement packet transmitted back to the source.

In one embodiment, the received value is stored in a payload of the acknowledgement packet.

In one embodiment, a first number of the plurality of values is greater than a second number of the plurality of ports.

In one embodiment, the plurality of ports are specified as hash function outputs of the plurality of values.

In one embodiment, the logic circuit stores different values of the plurality of values in different packets of the plurality of packets being transmitted to a destination so that different packets pass through different ports of the plurality of ports of the at least one switch during the transmission to the destination.

In one embodiment, the network interface circuit receives a plurality of acknowledgement packets in response to at least a portion of the plurality of packets transmitted to the destination, the plurality of acknowledgement packets each comprising a value from a corresponding transmitted packet, the logic circuit deleting, from the memory, a first value of the values stored in memory when the received value stored in the acknowledgement packet matches the first value.

In one embodiment, the network interface circuit comprises: a receive processor configured to receive packets; and a transmit processor configured to transmit packets, wherein a first portion of the logic circuit is coupled to the transmit processor and a second portion of the logic circuit is coupled to the receive processor, wherein the first portion of the logic circuit stores the at least one value in each packet being transmitted and further stores, for each packet, a packet identifier and the at least one value in a first portion of the memory, and wherein the second portion of the logic circuit extracts a first value from an acknowledgement packet and sends a signal coupled to the first portion of the logic circuit that the first value was received, wherein the first portion of the logic circuit deletes, from the first portion of the memory, the first value and the packet identifier in response to the signal.

In one embodiment, the packets are transmitted over a spray network.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A circuit comprising:
   a memory;
   a network interface circuit configured to transmit and receive a plurality of packets and a plurality of acknowledgement packets between a source device and a destination device, wherein said circuit is part of the source device; and
   a logic circuit configured to:
      store, in the memory, a plurality of values mapping to a plurality of ports of a first switch in which the plurality of packets passes through during transmission to the destination device;
      store a value of the plurality of values in each packet of the plurality of packets, cycling through the plurality of values on successive packets, being transmitted to the destination device, wherein the stored value indicates a port of the plurality of ports through which the respective packet is to pass; and
      remove a particular value of the plurality of values stored in the memory based on a status of pending acknowledgement packets, each of the pending acknowledgement packets comprising a payload storing the particular value, wherein the status comprises a count of the pending acknowledgement packets being above a threshold.

2. The circuit of claim 1, wherein the first switch selects an indicated port for a particular packet based on the stored value of the particular packet.

3. The circuit of claim 1, wherein the status is a timeout.

4. The circuit of claim 1, wherein the particular value is removed at a sampling interval upon determining that the count of the pending acknowledgement packets is above the threshold at the sampling interval.

5. The circuit of claim 1, further comprising storing, in the memory, a packet identifier, wherein the packet identifier for each packet being transmitted is associated with the value stored in the packet.

6. The circuit of claim 1, wherein the value is stored in a User Datagram Protocol (UDP) source field of a header of the respective packet of the plurality of packets being transmitted to the destination.

7. The circuit of claim 1, wherein the logic circuit is further configured to, for each packet received from a source, store a received value from a received packet in a second acknowledgement packet transmitted back to the source.

8. The circuit of claim 7, wherein the received value is stored in a payload of the second acknowledgement packet transmitted back to the source.

9. The circuit of claim 1, wherein a first number of the plurality of values is greater than a second number of the plurality of ports.

10. The circuit of claim 9, wherein the plurality of ports are specified as hash function outputs of the plurality of values.

11. The circuit of claim 1, wherein the logic circuit stores different values of the plurality of values in different packets of the plurality of packets being transmitted to the destination so that different packets pass through different ports of the plurality of ports of the first switch during the transmission to the destination.

12. The circuit of claim 1, wherein the network interface circuit receives the plurality of acknowledgement packets in response to at least a portion of the plurality of packets transmitted to the destination device, the plurality of acknowledgement packets each comprising a value from a corresponding transmitted packet, the logic circuit deleting, from the memory, a first value of the values stored in memory when the value stored in the acknowledgement packet matches the first value.

13. The circuit of claim 1, wherein the network interface circuit comprises:
   a receive processor configured to receive packets; and
   a transmit processor configured to transmit packets,
   wherein a first portion of the logic circuit is coupled to the transmit processor and a second portion of the logic circuit is coupled to the receive processor,
   wherein the first portion of the logic circuit stores the value in each packet being transmitted and further stores, for each packet, a packet identifier and the value in a first portion of the memory, and
   wherein the second portion of the logic circuit extracts a first value from an acknowledgement packet and sends a signal coupled to the first portion of the logic circuit that the first value was received, wherein the first portion of the logic circuit deletes, from the first portion of the memory, the first value and the packet identifier in response to the signal.

14. The circuit of claim 1, wherein the packets are transmitted over a spray network, wherein the plurality of packets being transmitted are sent to the first switch coupled to said circuit, and wherein the plurality of packets are forwarded, by the first switch, to a plurality of second network switches using a plurality of different ports of the first switch, wherein particular ports are selected based on a particular value stored in each particular packet of the plurality of packets.

15. A method of recovering from faults in a network comprising:
   storing, in a memory of a source device, a plurality of values mapping to a plurality of ports of a first switch in which a plurality of packets passes through during transmission to a destination device;
   storing, using the source device, a value of the plurality of values in each packet of the plurality of packets, cycling through the plurality of values on successive packets, to be transmitted from the source device to the destination device during a data transmission,
   wherein the stored value indicates a port of the plurality of ports through which the respective packet is to pass;
   transmitting the plurality of packets; and
   removing a particular value of the plurality of values stored in the memory based on a status of pending acknowledgement packets, each of the pending acknowledgement packets comprising a payload storing the particular value, wherein the status comprises a count of the pending acknowledgement packets being above a threshold.

16. The method of claim 15, wherein the status is a timeout.

17. The method of claim 15, wherein the particular value is removed at a sampling interval upon determining that the count of the pending acknowledgement packets is above the threshold at the sampling interval.

18. The method of claim 15, wherein the value is stored in a User Datagram Protocol (UDP) source field of a header of the plurality of packets being transmitted to the destination device.

19. The method of claim 15, wherein the packets are transmitted over a spray network.

20. A storage device for storing a hardware definition language (HDL) program executable by a computer, the program comprising sets of instructions for:

storing, in a memory of a source device, a plurality of values mapping to a plurality of ports of a first switch in which a plurality of packets passes through during transmission to a destination device;

storing, using the source device, a value of the plurality of values in each packet of the plurality of packets, cycling through the plurality of values on successive packets, to be transmitted from the source device to the destination device during a data transmission, wherein the stored value indicates a port of the plurality of ports through which the respective packet is to pass;

transmitting the plurality of packets; and removing a particular value of the plurality of values stored in the memory based on a status of pending acknowledgement packets, each of the pending acknowledgement packets comprising a payload storing the particular value, wherein the status comprises a count of the pending acknowledgement packets being above a threshold.

* * * * *